US012600338B2

(12) United States Patent
Lee

(10) Patent No.: US 12,600,338 B2
(45) Date of Patent: Apr. 14, 2026

(54) AIR MANAGEMENT SYSTEM AND METHOD FOR REUSING EXHAUSTED AIR

(71) Applicants: HYUNDAI MOTOR COMPANY, Seoul (KR); KIA CORPORATION, Seoul (KR)

(72) Inventor: Se Joon Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 458 days.

(21) Appl. No.: 18/372,328

(22) Filed: Sep. 25, 2023

(65) Prior Publication Data

US 2024/0400029 A1 Dec. 5, 2024

(30) Foreign Application Priority Data

Jun. 2, 2023 (KR) ........................ 10-2023-0071791

(51) Int. Cl.
B60T 17/00 (2006.01)
B60T 13/68 (2006.01)
B60T 17/02 (2006.01)
*F15B 11/064* (2006.01)

(52) U.S. Cl.
CPC .......... B60T 17/002 (2013.01); B60T 13/683 (2013.01); B60T 17/02 (2013.01); *F15B 11/064* (2013.01)

(58) Field of Classification Search
CPC ........ B60T 17/002; B60T 17/02; B60T 17/06; B60T 17/004; B60T 13/683; B60T 13/261; F15B 21/14; F15B 2211/88
See application file for complete search history.

(56) References Cited

U.S. PATENT DOCUMENTS

| | | | | |
|---|---|---|---|---|
| 9,120,491 B2 * | 9/2015 | Creighton | ............... | B60T 15/48 |
| 12,065,111 B1 * | 8/2024 | Klier | ..................... | B60T 15/027 |
| 2019/0388827 A1 * | 12/2019 | Oldenettel | ......... | B01D 53/0454 |
| 2020/0114894 A1 * | 4/2020 | Leiber | ..................... | B60T 7/042 |
| 2020/0139948 A1 * | 5/2020 | Leiber | ................... | B60T 8/1755 |
| 2020/0238966 A1 * | 7/2020 | Ambrosi | ............ | F16K 31/0655 |
| 2022/0126805 A1 * | 4/2022 | Kloos | .................. | B60T 13/268 |
| 2022/0161774 A1 * | 5/2022 | Reuter | ................. | B60T 13/662 |
| 2024/0294158 A1 * | 9/2024 | Leiber | ..................... | B60T 7/042 |

(Continued)

FOREIGN PATENT DOCUMENTS

DE 102016124253 A1 * 6/2018 ......... B60G 17/0523

*Primary Examiner* — Bradley T King

(74) *Attorney, Agent, or Firm* — Morgan, Lewis & Bockius LLP

(57) ABSTRACT

An air management system of a vehicle includes an air compressor configured to generate compressed air; an air processing device configured to purify and dehumidify the compressed air discharged from the air compressor; a first air tank configured to store the compressed air passing through the air processing device; an air brake device configured to perform a braking operation of the vehicle using the compressed air stored in the first air tank; a second air tank configured to store exhausted air used for the braking operation and discharged; a solenoid valve connected to each of the second air tank and the air processing device through pipes and configured to control movement of the exhausted air between the second air tank and the air processing device; and a control unit configured to control opening or closing of the solenoid valve.

16 Claims, 3 Drawing Sheets

(56)            References Cited

U.S. PATENT DOCUMENTS

2024/0359669 A1 * 10/2024 Zhang ..................... B60T 8/17
2024/0375625 A1 * 11/2024 Leiber ..................... B60T 8/92
2025/0376137 A1 * 12/2025 van Thiel .............. B60T 8/5087

* cited by examiner

AIR MANAGEMENT SYSTEM AND METHOD FOR REUSING EXHAUSTED AIR

CROSS-REFERENCE TO RELATED APPLICATIONS

This application claims benefit of priority to Korean Patent Application No. 10-2023-0071791 filed on Jun. 2, 2023 in the Korean Intellectual Property Office, the disclosure of which is incorporated herein by reference in its entirety.

TECHNICAL FIELD

The present disclosure relates to an air management system and a method of reusing exhausted air, more particularly, an air management system and a method of reusing exhausted air which may store and reuse air used during a braking operation and exhausted.

BACKGROUND

Generally, an air brake system may be applied to a large commercial vehicle such as a truck or a trailer. An air management system (AMS) of such a vehicle may generate compressed air and may supply the generated compressed air to an air brake system as a working gas to manage the compressed air used for braking of the vehicle.

Using an air management system, compressed air may be generated using an air compressor, the compressed air may be dehumidified/purified through an air processing unit (e.g., an air processing unit (APU)), may be stored in an air tank, may supply the stored compressed air to a brake. In this process, the compressed air used to operate the brake may be discharged into the atmosphere and may be discarded.

SUMMARY

An air management system applied to an eco-friendly vehicle may use an electric air compressor. The electric air compressor may operate using power supplied from a battery of the vehicle. In the case of an eco-friendly vehicle, efficiency of the battery may be important. However, it may be undesirable in terms of battery efficiency to discharge compressed air generated by consuming battery power to the atmosphere after a one-time use.

An aspect of the present disclosure is to provide an air management system and a method thereof which may reduce air compressor operation time and may increase battery efficiency by reusing air used for a braking operation in an eco-friendly vehicle including an air brake system.

According to an embodiment of the present disclosure, an air management system of a vehicle includes an air compressor configured to generate compressed air; an air processing device fluidly connected to the air compressor and configured to purify and/or dehumidify the compressed air discharged from the air compressor; a first air tank fluidly connected to the air processing device and configured to store the compressed air passing through the air processing device; an air brake device fluidly connected to the first air tank and configured to perform a braking operation of the vehicle using the compressed air stored in the first air tank; a second air tank fluidly connected to the air brake device and configured to store exhausted air that is discharged from the air brake device and that is used for the braking operation; a solenoid valve connected to each of the second air tank and the air processing device through pipes and configured to control movement of the exhausted air between the second air tank and the air processing device; and a control unit in communication with the solenoid valve and configured to control opening or closing of the solenoid valve.

The air processing device may include a first port connected to the second air tank through a pipe to allow the exhausted air in the second air tank to flow in, and a second port connected to the air compressor through a pipe to allow the compressed air generated by the air compressor to flow in.

The air management system may further include a first pressure sensor disposed between the solenoid valve and the air processing device, the first pressure sensor is configured to: detect first pressure information between the solenoid valve and the air processing device, and transmit the first pressure information to the control unit.

The control unit may be configured to open the solenoid valve based on the first pressure information.

When an exhausted air reuse criterion, which is a criterion of a circumstance in which the air management system is able to use the exhausted air stored in the second air tank for the braking operation, is satisfied, the control unit may open the solenoid valve, and when the solenoid valve is opened, the exhausted air may be supplied to the air processing device, may pass through the air processing device, and may be stored in the first air tank.

The control unit may be further configured to collect driving information including vehicle speed and a number of times a braking operation is performed, and the control unit may be further configured to determine whether the exhausted air reuse criterion is satisfied based on whether at least one of following conditions is satisfied: a first condition in which pressure included in the first pressure information is less than or equal to a first reference pressure, a second condition in which the number of times the braking operation is performed is less than or equal to a reference number during a reference time, and a third condition in which the vehicle speed is less than or equal to a reference speed.

The control unit may be further configured to determine that the exhausted air reuse criterion is satisfied when the first condition is satisfied and one of the second condition and the third condition is satisfied.

The control unit may be further configured to determine whether the second condition is satisfied when the first condition is satisfied, and the control unit may be further configured to open the solenoid valve when the second condition is satisfied.

The control unit may be further configured to determine whether the third condition is satisfied when the second condition is not satisfied, and the control unit may be configured to open the solenoid valve when the third condition is satisfied.

The air management system may further include a second pressure sensor connected to the second air tank, the second pressure sensor is configured to: detect second pressure information in the second air tank, and transmit the second pressure information to the control unit.

When the solenoid valve is open, the control unit may close the solenoid valve based on the second pressure information.

When pressure included in the second pressure information is less than a second reference pressure, the control unit may close the solenoid valve.

According to an embodiment of the present disclosure, a method of managing air within a vehicle includes passing compressed air generated by an air compressor through the air processing device and storing the compressed air in a first air tank; performing a braking operation of the vehicle utilizing the compressed air stored in a first air tank; storing exhausted air utilized for the braking operation and discharged from an air brake device in a second air tank; determining, by a control unit, whether an exhausted air reuse criterion, which is a criterion of circumstance in which the exhausted air stored in the second air tank can be used for the braking operation, is satisfied; and opening, by the control unit, a solenoid valve connected to the second air tank and the air processing device in response to the exhausted air reuse criterion being satisfied.

The determining whether the exhausted air reuse criterion is satisfied may include detecting, by a first pressure sensor, first pressure information between the solenoid valve and the air processing device and determining, by the control unit, whether a first condition in which the pressure included in the first pressure information is equal to or less than a first reference pressure is satisfied; determining, by the control unit, whether a second condition in which a number of times the braking operation is performed is less than a reference number during a reference time is satisfied, in response to the first condition being satisfied, and opening, by the control unit, the solenoid valve such that the exhausted air passes through the air processing device and is stored in the first air tank in response to the second condition being satisfied.

The determining whether the exhausted air reuse criterion is satisfied may include determining, by the control unit, whether a third condition in which a vehicle speed is less than a reference speed is satisfied, in response to the second condition being not satisfied, and opening, by the control unit, the solenoid valve in response to the third condition being satisfied.

The method may further include detecting, by a second pressure sensor, second pressure information in the second air tank in response to the solenoid valve being opened; and determining, by the control unit, whether the pressure included in the second pressure information is less than or equal to the second reference pressure, and closing, by the control unit, the solenoid valve in response to the pressure included in the second pressure information being less than the second reference pressure.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
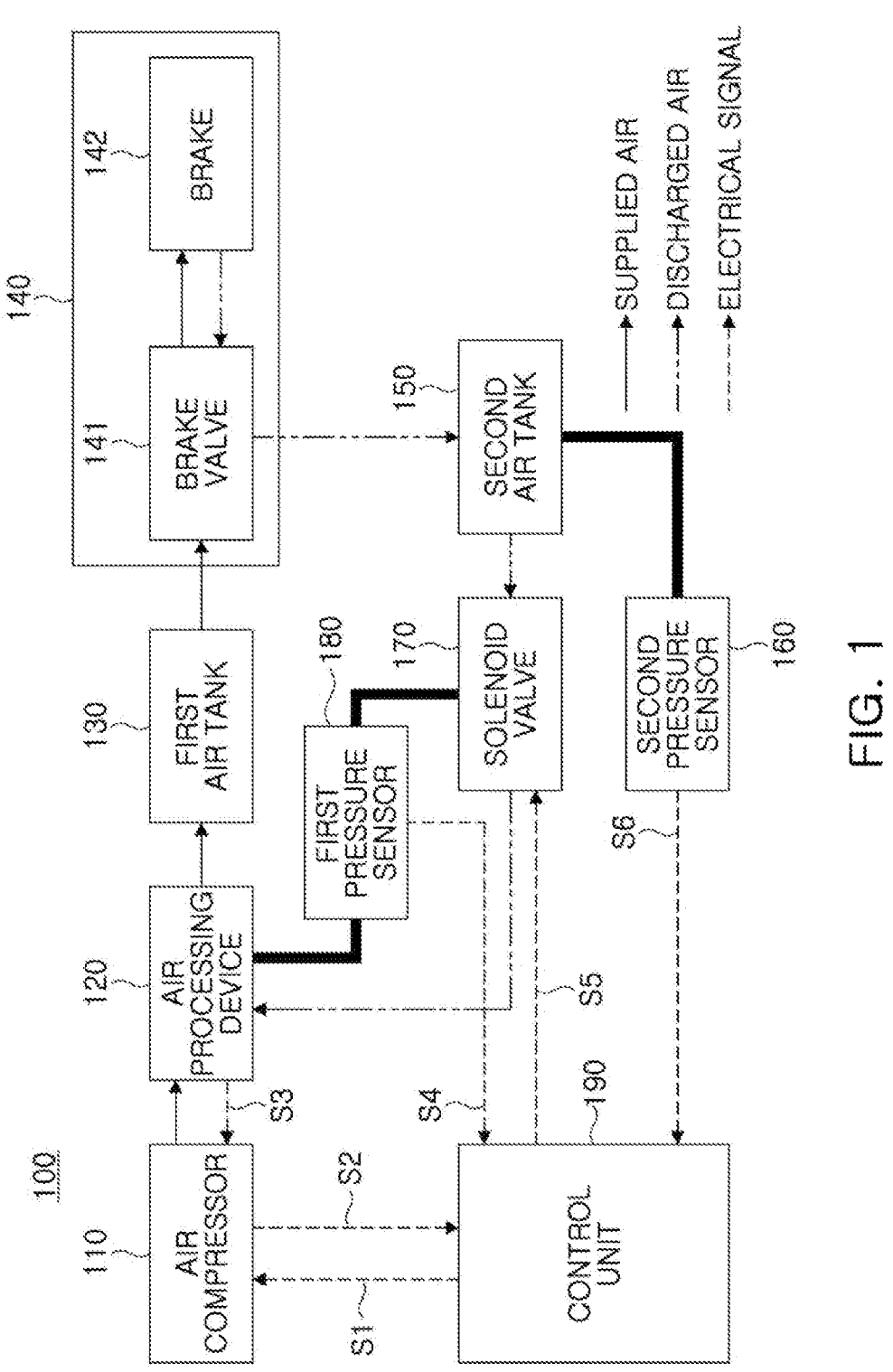
FIG. 1 is a diagram illustrating an air management system according to an embodiment of the present disclosure.

Hereinafter, embodiments of the present disclosure will be described with reference to the attached drawings.

Various embodiments will be described with reference to accompanying drawings. However, this may not necessarily limit the scope of the embodiments to a specific embodiment form. Instead, modifications, equivalents and replacements included in the disclosed concept and technical scope of this description may be employed. Throughout the specification, similar reference numerals are used for similar elements.

In the embodiments, the term "connected" may not only refer to "directly connected" but also include "indirectly connected" by means of an adhesive layer, or the like. Also, the term "electrically connected" may include both of the case in which elements are "physically connected" and the case in which elements are "not physically connected." Further, the terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of right of the embodiments.

The terms, "include," "comprise," "is configured to," etc. of the description are used to indicate the presence of features, numbers, steps, operations, elements, parts or combination thereof, and do not exclude the possibilities of combination or addition of one or more features, numbers, steps, operations, elements, parts or combination thereof.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

In embodiments, a vehicle may refer to a variety of vehicles for transporting objects such as people, animals, and objects, from a starting point to a destination. The vehicles are not limited to those driving on roads or tracks.

Figure 2:
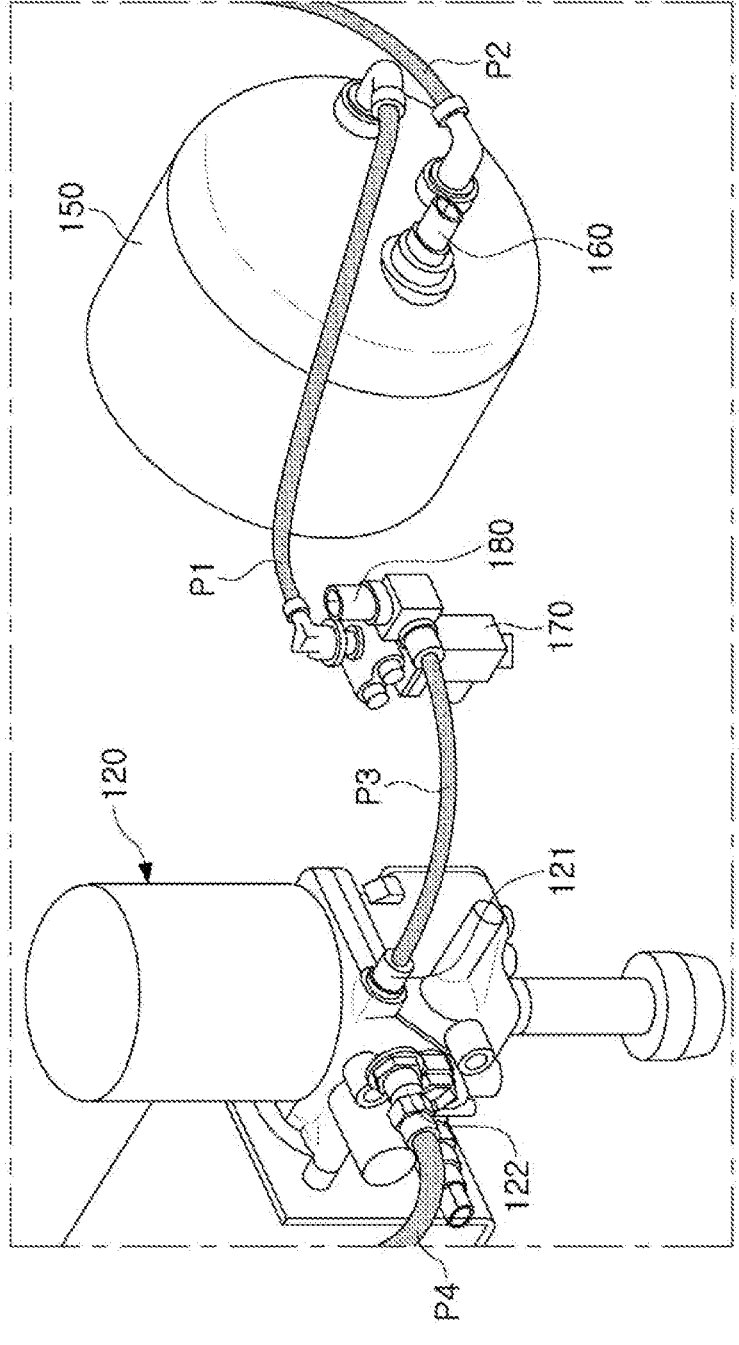
FIG. 2 is a perspective diagram illustrating a connection structure of an air processing device, a second air tank, and a solenoid valve of an air management system according to an embodiment of the present disclosure.

FIG. 1 is a diagram illustrating an air management system 100 according to an embodiment. FIG. 2 is a perspective diagram illustrating a connection structure of an air processing device 120, a second air tank 150, and a solenoid valve 170 of an air management system 100 according to an embodiment.

FIG. 1 schematically illustrates components of an air management system 100 according to an embodiment. FIG. 2 illustrates specific shapes of an air processing device 120, a second air tank 150, a solenoid valve 170, a first pressure sensor 180 and a second pressure sensor 160 among the components of the air management system 100 illustrated in FIG. 1 and connection relationships therebetween.

The air management system (AMS) 100 according to an embodiment may be applied to an eco-friendly commercial vehicle having an air brake system (e.g., a pneumatic braking system). For example, the air brake system may be applied to a large commercial vehicle such as a truck, a trailer or a bus, and the air management system 100 of the vehicle may manage air supplied to the air brake system and used for braking. An eco-friendly vehicle may include a hybrid vehicle (HEV), a plug-in hybrid vehicle (PHEV), an electric vehicle (EV) and a fuel cell vehicle (FCEV). However, a vehicle to which the air management system 100 according to an embodiment is applied is not limited to an eco-friendly commercial vehicle, and may be applied to various types of vehicles including an air brake system.

Referring to FIGS. 1 and 2, the air management system 100 according to the embodiment may include an air compressor 110, an air processing device 120, a first air tank 130, an air brake device 140, a second air tank 150, a second pressure sensor 160, a solenoid valve 170, a first pressure sensor 180 and a control unit 190.

The air compressor 110 may generate compressed air. For example, the air compressor 110 may generate compressed air and may deliver the generated compressed air to the air processing device 120. In an embodiment, the air management system 100 may be applied to an eco-friendly vehicle, and in this case, the air compressor 110 may be configured as an electric air compressor. For example, DC power from a battery of an eco-friendly vehicle may be changed to 3-phase alternating current by passing through an inverter (not illustrated) and may be supplied to an electric air compressor, and a cylinder may move backward and forward by an electrical motor of the electric air compressor and a rotational motion of the crankshaft, thereby compressing and discharging air. However, the type of air compressor 110 is not limited to the above-described example.

The air processing device 120 may dehumidify and/or purify compressed air delivered from the air compressor 110. The air processing device 120 may be referred to as an air processing unit (APU). For example, the air processing device 120 may be configured as a device which may remove moisture and foreign substances from air supplied to the first air tank 130, and the compressed air discharged from the air compressor 110 may go through a process of collecting and dehumidifying foreign substances while passing through the cartridge provided in the air processing device 120, and accordingly, and clean and dry air passing through the air processing device 120 may be supplied to the first air tank 130. In embodiments, the air processing device 120 may be referred to as an air dryer. The air processing device 120 may be connected to the air compressor 110, the first air tank 130 and the solenoid valve 170 through pipes P3 and P4 to move air.

The first air tank 130 may store compressed air having passed through the air processing device 120. For example, the compressed air generated by the air compressor 110 may pass through the air processing device 120 and may fill the first air tank 130. Air stored in the first air tank 130 may be used for operation of the air brake device 140. The first air tank 130 may be connected to the air processing device 120 and the air brake device 140 through a pipe to move air.

The air brake device 140 may brake the vehicle using the compressed air stored in the first air tank 130. The air brake device 140 may include a brake valve 141 and a brake 142. The brake valve 141 may control the movement of compressed air supplied from the first air tank 130 and the movement of exhausted air discharged (or expelled) from the brake 142 by turning on/off (or opening/closing) operations. The turning on/off of the brake valve 141 may be controlled by a control signal transmitted from the control unit 190.

The brake valve 141 of the air brake device 140 may be connected to the first air tank 130 and the second air tank 150 through a pipe to move air. Compressed air stored in the first air tank 130 may be supplied to the brake 142 through the brake valve 141. For example, when a driver presses a brake pedal to brake a vehicle, compressed air in the first air tank 130 may move to the brake 142 through an inlet port of the brake valve 141. Exhausted air from the brake 142 may be supplied to the second air tank 150 through the brake valve 141. For example, when the driver releases the brake pedal after braking of the vehicle is completed, air supplied and used for operation of the brake 142 may be discharged from the brake 142, and exhausted air may move to the second air tank 150 through an outlet port of the brake valve 141. The air management system 100 according to the embodiment may store exhausted air in the second air tank 150 for reuse, differently from a general system for discharging compressed air used in operation of the brake 142 into the atmosphere.

The second air tank 150 may store exhausted air from the brake 142. For example, air discharged after being used for operation of the brake 142 may fill the second air tank 150 through the brake valve 141. Exhausted air stored in the second air tank 150 may be delivered to the air processing device 120 through a path separate from compressed air supplied from the air compressor 110. For example, exhausted air stored in the second air tank 150 may move to the air processing device 120 through the solenoid valve 170 when a predetermined reuse condition is satisfied, and the exhausted air may pass through the air processing device 120 and may be stored in the first air tank 130. The exhausted air in the second air tank 150 may pass through the solenoid valve 170 and the air processing device 120 and may fill the first air tank 130, and may be reused for operation of the air brake device 140. Exhausted air in the second air tank 150 may be purified into clean air by passing through the air processing device 120. The second air tank 150 may be connected to the brake valve 141 and the solenoid valve 170 through pipes P1 and P2 to move air.

The second pressure sensor 160 may measure pressure in the second air tank 150. The second pressure sensor 160 may detect and provide pressure information in the second air tank 150. The second pressure sensor 160 may transmit information about the detected pressure of the second air tank 150 to the control unit 190. The second pressure sensor 160 may monitor the air pressure condition of the second air tank 150 in real time. The pressure information detected by the second pressure sensor 160 may be used to determine whether the exhausted air may be reused for operation of the brake 142 by determining the amount of exhausted air stored in the second air tank 150. For example, when the pressure detected by the second pressure sensor 160 is less than a second reference pressure, the amount of exhausted air stored in the second air tank 150 may be insufficient for operation of the brake 142, such that the exhausted air may not be reused and the air compressor 110 may be operated to supply compressed air for operation of the brake 142.

The solenoid valve 170 may be connected to the air processing device 120 and the second air tank 150 through the pipes P1 and P3 to move air, and may control the movement of air between the air processing device 120 and the second air tank 150. The solenoid valve 170 may supply exhausted air in the second air tank 150 to the air processing device 120 or may stop supplying the air by turning on/off (or opening/closing) operations. The turning on/off of the solenoid valve 170 may be controlled by a control signal S5 transmitted from the control unit 190.

The first pressure sensor 180 may be installed between the solenoid valve 170 and the air processing device 120 and may measure pressure between the solenoid valve 170 and the air processing device 120. The first pressure sensor 180 may detect pressure information between the solenoid valve 170 and the air processing device 120 and may provide the information. Pressure information detected by the first pressure sensor 180 may be used to determine whether exhausted air stored in the second air tank 150 may flow into the air processing device 120. For example, when the pressure detected by the first pressure sensor 180 exceeds a first reference pressure, the air in the second air tank 150 may not flow into the air processing device 120, and there may be a possibility that the air in the pipe P3 connecting the air processing device 120 to the solenoid valve 170 may flow backward, such that exhausted air may not be reused and compressed air may be supplied by operating the air compressor 110 for operation of the brake 142. Here, pressure detected by the first pressure sensor 180 may exceed the first reference pressure due to residual air remaining in the pipe P3 when the air compressor 110 is in operation or right after the operation.

The control unit 190 may be configured as a computing system for a vehicle, may control overall processes of the air management system 100 according to an embodiment, and may control operation of components included in the air management system 100.

The control unit 190 may control the air compressor 110, the solenoid valve 170 and the brake valve 141. For example, the control unit 190 may apply a first signal S1 for control of the air compressor 110, and may receive a second signal S2 related to an operation state, whether driving is ready, and whether to receive a turning on/off signal from the air compressor 110. The control unit 190 may apply a fifth signal S5 related to operation (turning on/off) to the solenoid valve 170. The control unit 190 may apply a signal related to operation (turning on/off) to the brake valve 141.

The control unit 190 may control the air compressor 110 based on a signal S3 transmitted from the air processing device 120 to the air compressor 110. The air compressor 110 may receive the third signal S3 related to turning on/off operation of the air compressor 110 from the air processing device 120. For example, when the air compressor 110 receives an operation turning on-signal of the air compressor 110 from the air processing device 120, the air compressor 110 may operate by the control signal S1 transmitted from the control unit 190, and conversely, when the air compressor 110 receives an operation turning off-signal of the air compressor 110 from the air processing device 120, the operation may be stopped by the control signal S1 transmitted from the control unit 190.

In various embodiments, the turning on/off signal of the air compressor 110 transmitted by the air processing device 120 may be determined based on pressure information detected by an internal pressure sensor provided in the air processing device 120. For example, the internal pressure sensor may be configured as a pressure switch, and when the pressure in the first air tank 130 reaches a cut-in pressure (e.g., set minimum pressure), the internal pressure sensor may transmit the information and may transmit a signal to operate the air compressor 110, and when pressure in the first air tank 130 reaches a cut-out pressure (e.g., set maximum pressure), the internal pressure sensor may sense the information and may transmit a signal for stopping operation of the air compressor 110.

The control unit 190 may determine whether the state of the vehicle and the driving circumstance satisfy a reuse criterion for operating the brake 142 using exhausted air, and may control the solenoid valve 170 and the air compressor 110 based on the determination. The control unit 190 may be a vehicle control unit (VCU).

Here, the reuse criterion of exhausted air may be determined on the basis of whether one of a first condition for whether the detected pressure of the first pressure sensor 180 is less than or equal to the first reference pressure is satisfied, a second condition for whether the number of times a braking operation is performed is less than or equal to the reference number, and a third condition for whether the vehicle speed is less than or equal to the criterion speed is satisfied. For example, when the state of the vehicle and the driving circumstance satisfy both the first condition and the second condition, the control unit 190 may determine that the reuse criterion is satisfied. Also, for example, when the state of the vehicle and the driving circumstance do not satisfy the second condition and satisfy both the first condition and the third condition, the control unit 190 may determine that the exhausted air corresponds to the reuse criterion. The control unit 190 may determine whether the first condition, the second condition, and the third condition are satisfied in sequence.

The control unit 190 may receive pressure information detected by the first pressure sensor 180 and may determine whether the first condition is satisfied based on the transmitted pressure information. For example, the control unit 190 may receive the fourth signal S4 related to the pressure information detected by the first pressure sensor 180 and may determine that the first condition is satisfied when the pressure is less than or equal to a predetermined first reference pressure. The control unit 190 may determine whether the second condition is satisfied when the first condition is satisfied, and may operate the air compressor 110 when the first condition is not satisfied.

The control unit 190 may detect the number of times the brake 142 operates, and based on the detection, the control unit 190 may determine whether the second condition is satisfied. For example, the control unit 190 may detect the number of times the brake pedal operates during the reference time, and when the number is less than a predetermined reference number, it may be determined that the second condition is satisfied. The control unit 190 may turn on (open) the solenoid valve 170 when the second condition is satisfied, and the control unit 190 may determine whether the third condition is satisfied when the second condition is not satisfied.

The control unit 190 may detect a speed of the vehicle and, based on the detection, the control unit 190 may determine whether the third condition is satisfied. For example, the control unit 190 may determine that the third condition is satisfied when the vehicle speed is less than a predetermined reference speed. The control unit 190 may turn on (open) the solenoid valve 170 when the third condition is satisfied, and the control unit 190 may operate the air compressor 110 when the third condition is not satisfied.

A method of managing air for reusing exhausted air based on whether the state of the vehicle and the driving circumstance satisfy the reuse criterion will be described in greater detail with reference to the flowchart in FIG. 3 below.

The control unit 190 may receive pressure information detected by the second pressure sensor 160 and may control the solenoid valve 170 by determining the transmitted pressure information. The control unit 190 may receive the sixth signal S6 related to the pressure information detected by the second pressure sensor 160, may determine whether the pressure is equal to or less than a predetermined second reference pressure, and may control the solenoid valve 170 based on the determination. For example, when the detected pressure of the second pressure sensor 160 is higher than the second reference pressure while the solenoid valve 170 is turned on (opened) in accordance with the reuse criterion, the control unit 190 may maintain the turned-on state of the solenoid valve 170, and when the detected pressure of the pressure sensor 160 is lower than the second reference pressure, the solenoid valve 170 may be turned off (closed).

In the description below, a structure in which the air processing device 120, the second air tank 150 and the solenoid valve 170 of the air management system 100 according to an embodiment are connected to each other will be described with reference to FIG. 2.

In the air management system 100 according to the embodiment, the second air tank 150, the solenoid valve 170 and the air processing device 120 may form a path through which exhausted air reused for the operation of the brake 142 moves.

The second air tank 150 filled with exhausted air may be connected to the solenoid valve 170 through the first pipe P1 and may be connected to the brake valve 141 through the second pipe P2. The air processing device 120 may be connected to the solenoid valve 170 through the third pipe P3 and may be connected to the air compressor 110 through the fourth pipe P4. Although not illustrated, t the air processing device 120 may be connected to the first air tank 130 through an additional pipe (not illustrated).

Exhausted air from the brake 142 may move to the second air tank 150 through the second pipe P2. Air in the second air tank 150 may move to the air processing device 120 through the first pipe P1, the solenoid valve 170 and the third pipe P3. For example, the solenoid valve 170 may communicate the first pipe P1 to third pipe P3 or may close the pipe. Air compressed by the air compressor 110 may move to the air processing device 120 through the fourth pipe P4.

The air processing device 120 may include a first port 121 into which exhausted air stored in the second air tank 150 flows and a second port 122 into which compressed air generated by the air compressor 110 flows. For example, the third pipe P3 may be connected to first port 121, and the fourth pipe P4 may be connected to second port 122. The exhausted air in the second air tank 150 may flow into the air processing device 120 through the first port 121 separated from the second port 122, such that the air may pass through the air processing device 120 in a path separate from the air compressed by the air compressor 110.

A second pressure sensor 160 for detecting pressure in the second air tank 150 may be installed on an external side of the second air tank 150. A first pressure sensor 180 for detecting pressure between the solenoid valve 170 and the air processing device 120 may be installed on an external side of the solenoid valve 170.

Figure 3:
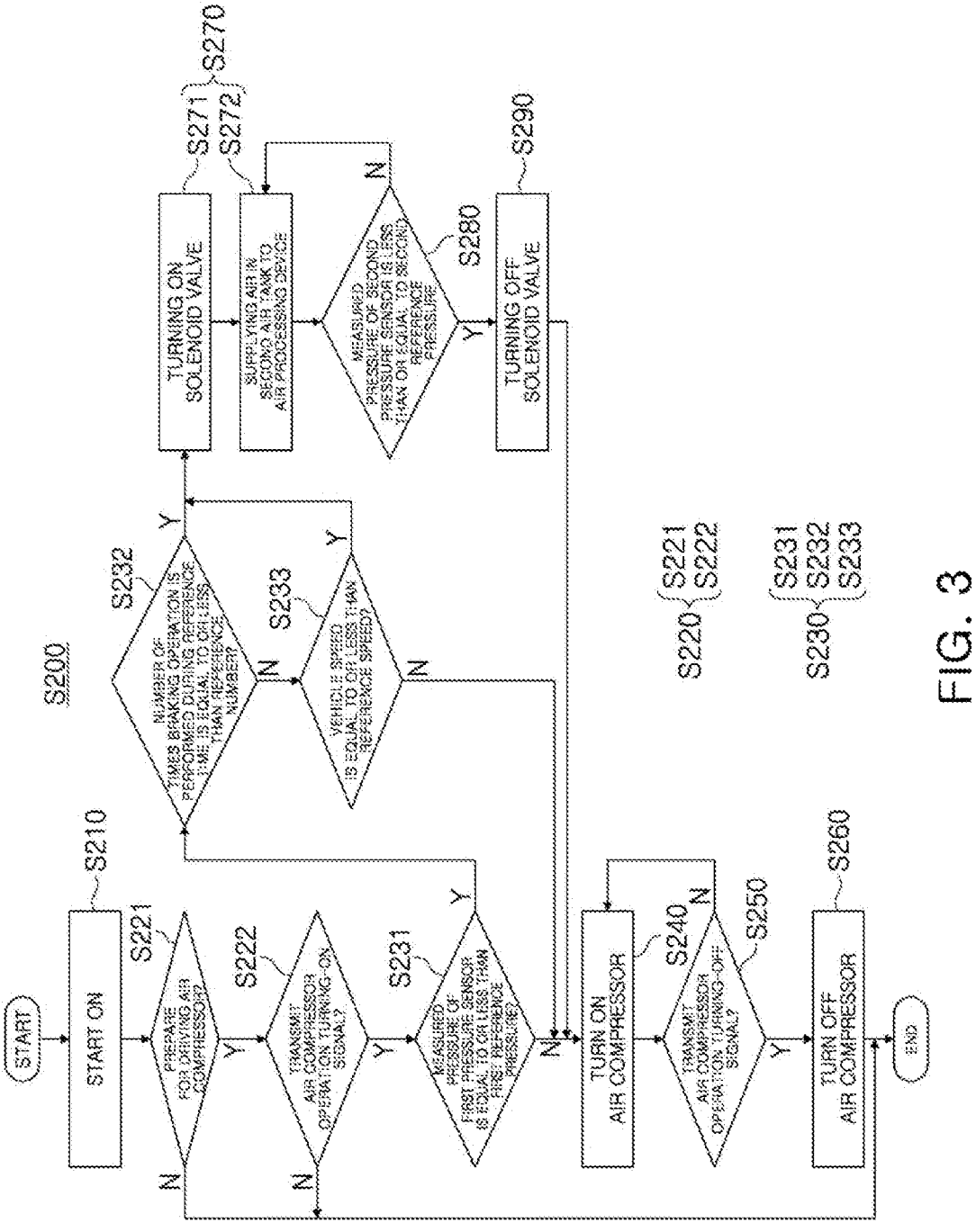
FIG. 3 is a flowchart illustrating a method of managing air according to an embodiment of the present disclosure.

FIG. 3 is a flowchart illustrating a method S200 of managing air according to an embodiment.

The method S200 of managing air according to an embodiment relates to a method of managing compressed air for an air brake in a vehicle to which the air management system 100 described with reference to FIGS. 1 and 2 is applied, and each operation of the method S200 of managing air may be performed by at least a portion of the components included in the air management system 100. Accordingly, the description of the air management system 100 may be equally applied to the method S200 of managing air. Hereinafter, the method S200 of managing air according to an embodiment will be described with reference to FIG. 3 together with FIGS. 1 and 2.

Referring to FIG. 3, the method S200 of managing air according to the embodiment may include operation S210 for starting a vehicle, operation S220 for determining whether an air compressor operates, operation S230 of determining whether the exhausted air reuse criterion is applicable, operation S240 of turning on operation of the air compressor, operation S250 for determining whether to transmit an air compressor operation turning off-signal, operation S260 of turn off operation of the air compressor, operation S270 of reusing the exhausted air stored in the second air tank for an air braking operation, operation S280 of determining whether measured pressure of the second pressure sensor is less than or equal to the second reference pressure, and operation S290 of turning off the solenoid valve. It may be understood that the method S200 of managing air may be performed in a state in which exhausted air from the brake 142 is stored in the second air tank 150 due to operation of the vehicle.

Operation S210 of turning on the vehicle may include an operation of pressing a start button of the vehicle by a user. The method S200 of managing air may be performed while the vehicle is started on.

Operation S220 for determining whether the air compressor is operating may include operation S221 for determining whether the air compressor is ready to be driven and operation S222 for determining whether to transmit an operation turning-on signal of the air compressor from the air processing device. When the operation of the air compressor 110 is ready, it may be determined whether the air processing device 120 is transmitting an operation turning-on signal of the air compressor 110. When the operation of the air compressor 110 is not ready or when the air processing device 120 does not transmit an operation turning-on signal of the air compressor 110, the air compressor 110 may not operate.

Operation S230 of determining whether the exhausted air reuse criterion corresponds may be performed when an operation turning-on signal of the air compressor 110 is transmitted after driving of the air compressor 110 is prepared. The operation S230 of determining whether the exhausted air reuse criterion is applicable may include operation S231 of determining whether a first condition is satisfied, operation S232 of determining whether a second condition is satisfied, and operation S233 of determining whether a third condition is satisfied. The descriptions of the first condition, the second condition and the third condition may be the same as the examples described in FIGS. 1 and 2 above.

In operation S231 of determining whether the first condition is satisfied, it may be determined whether the measured pressure of the first pressure sensor 180 is equal to or less than the first reference pressure. In operation S232 of determining whether the second condition is satisfied, it may be determined whether the number of times the brake 142 is operated is less than or equal to the reference number during the reference time. In operation S233 of determining whether the third condition is satisfied, it may be determined whether the vehicle speed is equal to or less than the reference speed. Here, the first reference pressure, the reference time, the reference number and the reference speed may be defined as predetermined values based on the type of vehicle and/or settings by a driver. Operation S231 of determining whether the first condition is satisfied, operation S232 of determining whether the second condition is satisfied, and operation S233 of determining whether the third condition is satisfied may be performed in sequence. Although not illustrated, operation S230 of determining whether the exhausted air reuse criterion is satisfied may further include an operation of collecting various information measured from an accelerator pedal sensor and a brake pedal sensor based on which the number of times a braking operation is performed and a vehicle speed may be detected.

When the measured pressure of the first pressure sensor 180 is equal to or less than the first reference pressure, operation S232 of determining whether the braking operation is equal to or less than the reference number may be performed. When the measured pressure of the first pressure sensor 180 exceeds the first reference pressure, operation S240 of turning on the operation of the air compressor may be performed. The first condition may be a preceding condition for performing operations S231 and S232 for determining whether the second condition is satisfied. When the first condition is not satisfied, operation S270 of reusing exhausted air for the air braking operation may not be performed.

When the number of times a braking operation is performed is less than or equal to the reference number during the reference time, operation S270 of reusing exhausted air for the air braking operation may be performed. When the number of times a braking operation is performed during the reference time exceeds the reference number, operation S233 of determining whether the vehicle speed is equal to or less than the reference speed may be performed. When the first condition and the second condition are satisfied, operation S270 of reusing the exhausted air for the air braking operation may be performed without determining whether the third condition is satisfied.

When the vehicle speed is equal to or less than the reference speed, operation S270 of reusing exhausted air for air braking operation may be performed. When the vehicle speed exceeds the reference speed, operation S240 of turning on operation of the air compressor may be performed. Even when the second condition is not satisfied, when the first condition and the third condition are satisfied, operation S270 for reusing the exhausted air for the air braking operation may be performed.

In operation S240 of turning on the air compressor operation, the air compressor 110 may generate compressed air and may supply the compressed air to the air processing device 120, and the compressed air passing through the air processing device 120 may be stored in the first air tank 130. The air compressor 110 may operate on the basis of an operation turning-on signal applied by the air processing device 120.

In operation S250 of determining whether to transmit an air compressor operation turning-off signal, it may be determined whether the air processing device 120 transmits an operation turning-off signal of the air compressor 110 to the air compressor 110. When an operation turning-off signal is transmitted from the air processing device 120 to the air compressor 110, operation S260 of turning off operation of the air compressor may be performed. When an operation turning-off signal is not transmitted from the air processing device 120 to the air compressor 110, the operation state of the air compressor may be maintained without turning off the operation.

In operation S260 of turning off the operation of the air compressor, the air compressor 110 may stop generating compressed air. For example, when compressed air is sufficiently filled in the first air tank 130, the air processing device 120 may transmit an operation turning-off signal to the air compressor 110, and the air compressor 110 may stop the operation on the basis of the operation turning-off signal applied by the air processing device 120.

Operation S270 of reusing exhausted air stored in the second air tank for an air braking operation may be performed when the exhausted air reuse criterion s satisfied. Operation S270 of reusing exhausted air stored in the second air tank for an air braking operation may include operation S271 of turning on a solenoid valve and operation S272 of supplying air in the second air tank to an air processing device.

Operation S271 of turning on the solenoid valve may be performed when the measured pressure of the first pressure sensor 180 is less than the first reference pressure and the number of times a braking operation is performed is less than the reference number during the reference time (e.g., the first condition and the second condition are satisfied) or the number of times a braking operation is performed exceeds the reference number, and the measured pressure of the first pressure sensor 180 is less than the first reference pressure and the vehicle speed is less than the reference speed (e.g., the first condition and the third condition are satisfied).

Operation S272 of supplying air in the second air tank to the air processing device may be performed in a turn-on (open) state of the solenoid valve 170. For example, when the solenoid valve 170 is opened, the exhausted air stored in the second air tank 150 may be supplied to the air processing device 120 through the first port 121 of the air processing device 120, and the exhausted air passing through the air processing device 120 may be stored in the first air tank 130 and may be used for operation of the air brake device 140.

Operation S280 of determining whether the measured pressure of the second pressure sensor is less than or equal to the second reference pressure may be for determining whether the exhausted air in the second air tank 150 is in an appropriate amount to be used in operation of the brake 142, and may be performed after the exhausted air in the second air tank 150 is supplied to the air processing device 120. When the measured pressure of the second pressure sensor 160 is less than the second reference pressure, operation S290 of turning off the solenoid valve may be performed. When the measured pressure of the second pressure sensor 160 exceeds the second reference pressure, the turn-on state of the solenoid valve 170 may be maintained.

Operation S290 of turning off the solenoid valve may be performed when the amount of exhausted air in the second air tank 150 is equal to or less than a reference value. When the solenoid valve 170 is turned off (closed), the supply of exhausted air to the air processing device 120 may be stopped, and the operation of reusing the exhausted air for the operation of the brake 142 may be stopped. After the solenoid valve 170 is turned off, operation S240 of turning on the air compressor operation may be performed.

In the description below, along with the flowchart in FIG. 3, the example in which the exhausted air reuse criterion is satisfied and the example in which the exhausted air reuse criterion is not satisfied will be described on the premise of an embodiment in which the first reference pressure is 5 bar, the reference time is 1 minute, the reference number is 3 times, the reference speed is 50 km/h, and the second reference pressure is set to 1 bar. The numerical values described above are merely example and an embodiment thereof is not limited thereto.

First, the example in which the exhausted air reuse criterion is satisfied will be described. After the vehicle is turned on, the air compressor 110 may be driven, and when the air processing device 120 transmits an air compressor operation turning-on signal, the measured pressure of the first pressure sensor 180 may be determined. When the measured pressure of the first pressure sensor 180 is 1 bar, the pressure may be equal to or less than the first reference pressure, and accordingly, the number of times the brake 142 is operated may be determined. When the number of times the brake 142 is operated is 4 times in 1 minute, the number may exceed the reference number, such that the vehicle speed may be determined. When the vehicle speed is 20 km/h, the speed may be below the reference speed, and accordingly, the solenoid valve 170 may be opened, the exhausted air stored in the second air tank 150 may be supplied to the air processing device 120 and may be purified, may be stored in the first air tank 130, and may be supplied to the brake 142. After opening the solenoid valve 170, the measured pressure of the second pressure sensor 160 may be determined. When the measured pressure of the second pressure sensor 160 reaches 1 bar, the pressure may be below the second reference pressure, and accordingly, the solenoid valve 170 may be closed and the air compressor 110 may operate. When compressed air is sufficiently filled in the first air tank 130 by operation of the air compressor 110, the air processing device 120 may transmit an air compressor operation turning off-signal, and operation of the air compressor 110 may be stopped.

In the description below, the example in which the exhausted air reuse criterion is not satisfied will be described. After the vehicle is turned on, the air compressor 110 may be driven, and when the air processing device 120 transmits an air compressor operation turning-on signal, and the measured pressure of the first pressure sensor 180 may be determined. When the measured pressure of the first pressure sensor 180 is 5.5 bar, the pressure may exceed the first reference pressure, and accordingly, the air compressor 110 may operate to generate compressed air. In this case, whether the second condition and the third condition related to the number of times the brake 142 is operated and the vehicle speed are satisfied may not be considered.

In the air management system 100 and the method S200 according to an embodiment, the exhausted air reuse criterion may be related to a safe driving condition in which air may not need to be rapidly supplied using the air compressor 110 when the brake 142 is used. For example, when the number of times the brake 142 is operated exceeds the reference number during the reference time, the brake may be frequently used in the current operating section, and accordingly, a significant amount of the compressed air in the first air tank 130 may be used, such that the condition may be classified as a circumstance in which compressed air may need to be supplied rapidly. Also, for example, even when the number of times the brake 142 is operated exceeds the reference number during the reference time, when the speed of the vehicle is less than the reference speed, as the brake pedal is not pressed deeply during braking, the amount of air that may be required for braking may be relatively low, such that the condition may be classified as a circumstance in which stable braking may be performed even when the exhausted air stored in the second air tank 150 is used first.

An eco-friendly vehicle to which the air management system 100 according to an embodiment is applied may, by reusing exhausted air under safe driving conditions, reduce the number of air compressor 110 operating/hours, thereby increasing a lifespan of the air compressor 110 and increasing battery efficiency.

According to the aforementioned embodiments, since the exhausted air is reused after being used for braking operation, operation of an air compressor to generate compressed air may be reduced, thereby reducing the use of battery for the air compressor operation and increasing battery efficiency.

Also, since the operation time of the air compressor is reduced, a lifespan of the air compressor may be increased.

Also, since the air discharged from the brake is stored in a separate tank, noise generated in the process of being discharged to the atmosphere may be reduced.

While the embodiments have been illustrated and described above, it will be apparent to those skilled in the art that modifications and variations could be manufactured without departing from the scope of the present disclosure as defined by the appended claims.

What is claimed is:

1. An air management system of a vehicle, the air management system comprising:

an air compressor configured to generate compressed air;

an air processing device fluidly connected to the air compressor and configured to purify and/or dehumidify the compressed air discharged from the air compressor;

a first air tank fluidly connected to the air processing device and configured to store the compressed air passing through the air processing device;

an air brake device fluidly connected to the first air tank and configured to perform a braking operation of the vehicle using the compressed air stored in the first air tank;

a second air tank fluidly connected to the air brake device and configured to store exhausted air that is discharged from the air brake device and that is used for the braking operation;

a solenoid valve connected to each of the second air tank and the air processing device through pipes and configured to control movement of the exhausted air between the second air tank and the air processing device; and a control unit in communication with the solenoid valve and configured to control opening or closing of the solenoid valve.

2. The air management system of claim 1, wherein the air processing device includes:

a first port connected to the second air tank through a pipe to allow the exhausted air in the second air tank to flow in, and a second port connected to the air compressor through a pipe to allow the compressed air generated by the air compressor to flow in.

3. The air management system of claim 1, further comprising:

a first pressure sensor disposed between the solenoid valve and the air processing device, the first pressure sensor is configured to:

detect first pressure information between the solenoid valve and the air processing device, and transmit the first pressure information to the control unit.

4. The air management system of claim 3, wherein the control unit is configured to open the solenoid valve based on the first pressure information.

5. The air management system of claim 3, wherein, when an exhausted air reuse criterion, which is a criterion of a circumstance in which the air management system is able to use the exhausted air stored in the second air tank for the braking operation, is satisfied, the control unit opens the solenoid valve, and wherein, when the solenoid valve is opened, the exhausted air is supplied to the air processing device, passes through the air processing device, and is stored in the first air tank.

6. The air management system of claim 5, wherein the control unit is further configured to collect driving information including a vehicle speed and a number of times a braking operation is performed, and wherein the control unit is further configured to determine whether the exhausted air reuse criterion is satisfied based on whether at least one of following conditions is satisfied:

a first condition in which pressure included in the first pressure information is less than or equal to a first reference pressure, a second condition in which the number of times the braking operation is performed is less than or equal to a reference number during a reference time, and a third condition in which the vehicle speed is less than or equal to a reference speed.

7. The air management system of claim 6, wherein the control unit is further configured to determine that the exhausted air reuse criterion is satisfied when the first condition is satisfied and one of the second condition and the third condition is satisfied.

8. The air management system of claim 7, wherein the control unit is further configured to determine whether the second condition is satisfied when the first condition is satisfied, and wherein the control unit is further configured to open the solenoid valve when the second condition is satisfied.

9. The air management system of claim 8, wherein the control unit is further configured to determine whether the third condition is satisfied when the second condition is not satisfied, and wherein the control unit is configured to open the solenoid valve when the third condition is satisfied.

10. The air management system of claim 5, further comprising:

a second pressure sensor connected to the second air tank, the second pressure sensor is configured to:

detect second pressure information in the second air tank, and transmit the second pressure information to the control unit.

11. The air management system of claim 10, wherein, when the solenoid valve is open, the control unit closes the solenoid valve based on the second pressure information.

12. The air management system of claim 10, wherein, when pressure included in the second pressure information is less than a second reference pressure, the control unit closes the solenoid valve.

13. A method of managing air within a vehicle, the method comprising:

passing compressed air generated by an air compressor through the air processing device and storing the compressed air in a first air tank;

performing a braking operation of the vehicle utilizing the compressed air stored in a first air tank;

storing exhausted air utilized for the braking operation and discharged from an air brake device in a second air tank;

determining, by a control unit, whether an exhausted air reuse criterion, which is a criterion of circumstance in which the exhausted air stored in the second air tank can be used for the braking operation, is satisfied; and opening, by the control unit, a solenoid valve connected to the second air tank and the air processing device in response to the exhausted air reuse criterion being satisfied.

14. The method of claim 13, wherein the determining whether the exhausted air reuse criterion is satisfied includes:

detecting, by a first pressure sensor, first pressure information between the solenoid valve and the air processing device and determining, by the control unit, whether a first condition in which the pressure included in the first pressure information is equal to or less than a first reference pressure is satisfied;

determining, by the control unit, whether a second condition in which a number of times the braking operation is performed is less than a reference number during a reference time is satisfied, in response to the first condition being satisfied, and opening, by the control unit, the solenoid valve such that the exhausted air passes through the air processing device and is stored in the first air tank in response to the second condition being satisfied.

15. The method of claim 14, wherein the determining whether the exhausted air reuse criterion is satisfied includes:

determining, by the control unit, whether a third condition in which a vehicle speed is less than a reference speed is satisfied, in response to the second condition being not satisfied, and opening, by the control unit, the solenoid valve in response to the third condition being satisfied.

16. The method of claim 15, further comprising:

detecting, by a second pressure sensor, second pressure information in the second air tank in response to the solenoid valve being opened;

determining, by the control unit, whether the pressure included in the second pressure information is less than or equal to a second reference pressure, and closing, by the control unit, the solenoid valve in response to the pressure included in the second pressure information being less than the second reference pressure.

* * * * *